United States Patent [19]

Carter et al.

[11] 3,818,363

[45] June 18, 1974

[54] ELECTRON BEAM SEMICONDUCTOR AMPLIFIER DEVICE

[75] Inventors: John L. Carter, Ocean; Joseph W. McGowan, Spring Lake Heights, both of N.J.

[73] Assignee: The United States of America as represented by the Secretary of the Army, Washington, D.C.

[22] Filed: Dec. 12, 1972

[21] Appl. No.: 314,303

[52] U.S. Cl. .......... 330/43, 330/44, 315/3, 313/65 AB

[51] Int. Cl. .......... H03f 3/58

[58] Field of Search .......... 313/65 AB; 330/43, 44; 315/3

[56] References Cited

UNITED STATES PATENTS

| | | | |
|---|---|---|---|
| 3,445,778 | 5/1969 | Gerlach | 330/43 |
| 3,705,321 | 12/1972 | Wolfgang | 313/65 AB |
| 3,725,803 | 4/1973 | Yoder | 313/65 AB X |
| 3,733,510 | 5/1973 | Fischer et al. | 313/65 AB X |

*Primary Examiner*—Nathan Kaufman
*Attorney, Agent, or Firm*—Edward J. Kelly; Herbert Berl; Daniel D. Sharp

[57] ABSTRACT

An electron beam semiconductor amplifier tube having at least one array of parallelly connected, back-biased semiconductor diodes having an impedance low compared with that of the amplifier load and disposed along a wave energy transmission means at a region thereof of impedance substantially equal to that of each of the diodes. Each diode is bombarded by a hollow, current-modulated electron beam directed along the axis of the diode array and the beam electrons penetrate into the depletion region of the diode which is adjacent the bombarded surface. The interaction of the beam with each of the semiconductor target diodes produces an amplified current in a load circuit common to said diodes which is a function of the electron beam current. Wave energy generated by the current induced in each of the diodes by the impinging electron beam propagates along the transmission means to the load. The impedance of the transmission means is varied progressively as the load is approached, so that the low impedance diodes are matched to the load.

15 Claims, 11 Drawing Figures

ELECTRON BEAM SEMICONDUCTOR AMPLIFIER DEVICE

SUMMARY OF THE INVENTION

In this invention, an electron beam semiconductor amplifier is provided which relies upon the principle of electron beam ionization of certain solid state devices. One such device is a shallow pn junction diode which, in the absence of electron bombardment, has the usual large conduction for small forward biasing voltages and small conduction for reverse voltages below the avalanche breakdown voltage. When such a diode is reverse biased, the depletion region of the p-n or n-p junction will extend throughout the semiconductor, thereby establishing a high-field drift region - essential for rapid collection of injected carriers - without large standing currents in the device. Such a semiconductor device essentially comprises a metal film electrode-semiconductor-metal electrode film structure with a very shallow p-n or n-p junction beneath one of the metal contacts. Shallow junctions of high quality can be fabricated, for example, by the well known ion implantation technique.

If carriers are injected into the depletion region of such a solid state device, as by bombarding one of the metal electrodes with an accelerated electron beam having an energy of the order of 10KeV, some of the electrons from the beam penetrate one of the metal electrodes and enter the semiconductor with considerable energy, part of which excites valence band electrons into the conduction band to create electron-hole pairs. Since such a reverse biased solid state device essentially is a target upon which the electron beam impinges, it will sometimes be referred to henceforth as a semiconductor target diode. Owing to the very shallow p-n or n-p junction, the hole-electron pairs are created in the semiconductor target in a region of high electric field, so that these carrier pairs are rapidly separated, and the possibility of recombination is quite low. For this reason, one electronic charge will flow through an external circuit for each electron-hole pair created. The current gain for such a device, defined as the ratio of the semiconductor target current and the electron beam current, is equal to the number of carrier pairs created per beam electron entering the semiconductor with electron bombardment energy $W_b$.

For a semiconductor target of silicon with an aluminum contact layer 1000A ($10^{-7}$ meters) thick, it has been found that the current gain G is given approximately by $$G = W_b - 2\ \mathrm{KeV}/3.6\mathrm{eV} \qquad 1$$

The 2KeV term in the numerator represents the approximate energy loss in penetrating the metallic contact layer. The 3.6eV term in the denominator represents the energy dissipated in creating each of the electron-hole pairs; this term is somewhat material-dependent. For a beam with energy of 10KeV, the current gain becomes 1000 – 2000/3.6 or approximately 2220.

The output power of the semiconductor target diode begins to saturate when the electric field across the diode is reduced to a low value in the drift region. This may occur either as a result of low device voltage or because of carrier space charge effects. The output voltage limitation arises from the fact that the field in the drift region of the semiconductor target diode begins to collapse as the output voltage approaches the bias voltage. Assuming the bias voltage is half the breakdown voltage of the diode, the obtainable output current is approximately $$i_e = (l/2Z)\ V_B \qquad 2$$

where $V_B$ is the semiconductor target diode breakdown voltage in volts and $Z_L$ is the load impedance in ohms. The output current limitation arises since sufficient carrier space charge in the semiconductor target diode reduces the field in the drift region to a low or negative value at the injecting edge of the drift region. If the semiconductor target diode is assumed to be biased at half the breakdown voltage, the space charge limitation has been found to be such that currents can not exceed approximately $$i_e = 2\delta_o \epsilon A V_B / w^2 \qquad 3$$

where $\delta_o$ is the constant carrier drift velocity, $w$ is the width of the drift region $\epsilon$ is the permittivity of the silicon semiconductor target, and $A$ is the face area of the semiconductor target diode bombarded by the electron beam.

These effects of current reduction owing to both carrier space charge effects and to device voltage reduction generally combine to determine the output capability of the semiconductor target diode. Since both these effects vary inversely with the width of the drift region width $w$, it is possible to maximize the output capability by proper choice of drift region width, for a given load impedance. In this manner the output voltage and power capabilities of the diode can be maximized simultaneously. It has been shown that the maximized output $P_o$ , in watts, of the semiconductor target diode is approximated by the following expression $$P_o \quad = 2160 \quad (\delta_o/10^7)\ (r/11.5)\ A\ 6/7\ 50/Z_L \qquad 4$$

where $\delta_o$ is the charge carrier drift velocity expressed in $10^7$cm/sec, $r/11.5$ is the dielectric constant of the semiconductor material (silicon), $A$ is the area of the base of the semiconductor target diode bombarded by the electron beam in square millimeters and $Z_L$ is the load impedance in ohms.

The expression indicates that, for a given semiconductor material, the area should be increased and the load impedance reduced, in order to increase current and power. Material and fabrication problems impose a limitation on the area of a semiconductor target device. Moreover, the minimum transmission line impedance is restricted by dimension tolerances and by the characteristic impedance of the driven load (antenna, etc.).

The invention discloses a technique for eliminating both of these restrictions by providing means for increasing the total semiconductor target area and by permitting the semiconductor target to look into a relatively small impedance.

The device of the invention comprises one or more circular arrays of several semiconductor target diodes so that the area of the semiconductor target impinged by the electron beam is effectively increased. The diodes of each array are excited in parallel by a single longitudinally-directed hollow electron beam. In one embodiment, the semiconductor target diodes are mounted near the periphery of a radial transmission line at a region of relatively low impedance. The characteristic impedance of this radial transmission line is given by the expression $$Z_o = \quad \mu/\epsilon \; b/r$$

where $\mu$ is the permeability of the material filling the line, $\epsilon$ is the dielectric constant, $r$ is the radius of the transmission line and $b$ is the dimension of the radial line normal to the radial dimension. The dimension of the radial line can readily be fabricated with a desired value of impedance - which can be less than 0.1 ohm for maximum power - by proper choice of either or both of the dimensions $b$ and $r$. The impedance of the radial transmission line in the region of the semiconductor target diodes is made small to match the low impedance of the diodes.

The current induced in each diode by the electron beam generates a radial wave that propagates to the center of the radial transmission line. This radial wave can now be propagated to the load at any convenient impedance, such as 50 ohms, by way of an appropriate waveguide or can be transformed to a TEM wave which propagates along a centrally mounted coaxial transmission line to the external load. By gradually increasing the dimension $b$ as the center of the radial transmission line is approached, it is possible to provide a suitable impedance transformation between the low impedance diodes and the waveguide or coaxial line. The coaxial line, itself, may undergo dimensional changes to achieve impedance transformation between the diodes and the load. The device can be designed to perform either as a class A amplifier, in which case a single array of diodes of the same conductivity type is mounted near the periphery of the radial transmission line. The more efficient class B operation can be achieved by using a pair of separate concentric arrays of diodes, one array consisting of diodes of one conductivity type (for example, p-n) and the other array consisting of diodes of the opposite conductivity type (for example, n-p).

The device of the invention may be modified so that the array of semiconductor target diodes is mounted at one end of a coaxial transmission means between the inner and outer conductors thereof, that is, the radial transmission line-semiconductor target diode resonator assembly can be replaced by a coaxial transmission line-semiconductor target diode mounting assembly. The impedance of the coaxial transmission means is inversely proportional to the spacing between inner and outer conductors, so that the spacing between conductors is relatively small in the region of the coaxial transmission means at which the diodes of relatively low impedance are placed. Just as in the case of the radial transmission line using a centrally disposed coaxial line, the spacing between the conductors of the coaxial transmission means can be progressively increased in the direction of the load so that the proper impedance transformation between the diodes and the load is attained. The coaxial transmission line-semiconductor target diode mounting assembly can be adapted for class B operation by mounting two concentric arrays of diodes at the end of the coaxial transmission means. For example, one array of diodes can be mounted onto an enlarged portion of the inner conductor, while the other array of diodes - of opposite conductivity type - can be mounted into the outer conductor. The back-biased diodes of a given array can be connected to the other conductor of the coaxial transmission means by any suitable connecting means.

In the absence of a deflection input signal, the single hollow electron beam used to excite the diodes is in a quiescent position such that the beam cannot impinge upon any of the diodes. In the case of two concentric arrays of diodes, the electron beam, in the absence of a deflection input signal, will pass between the two arrays.

Figure 4A:
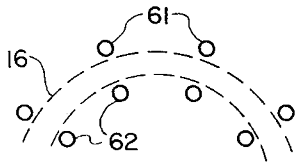
Figure 4B:
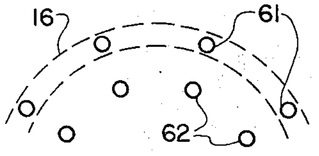
Figure 4C:
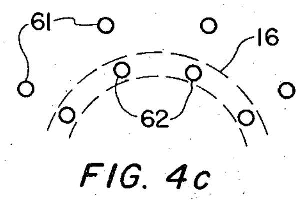
Figure 5A:
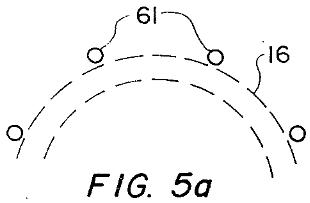
Figure 5B:
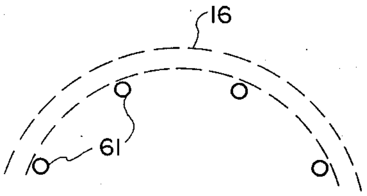
Figure 5C:
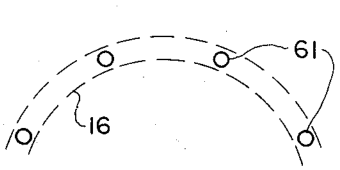
Figure 6:
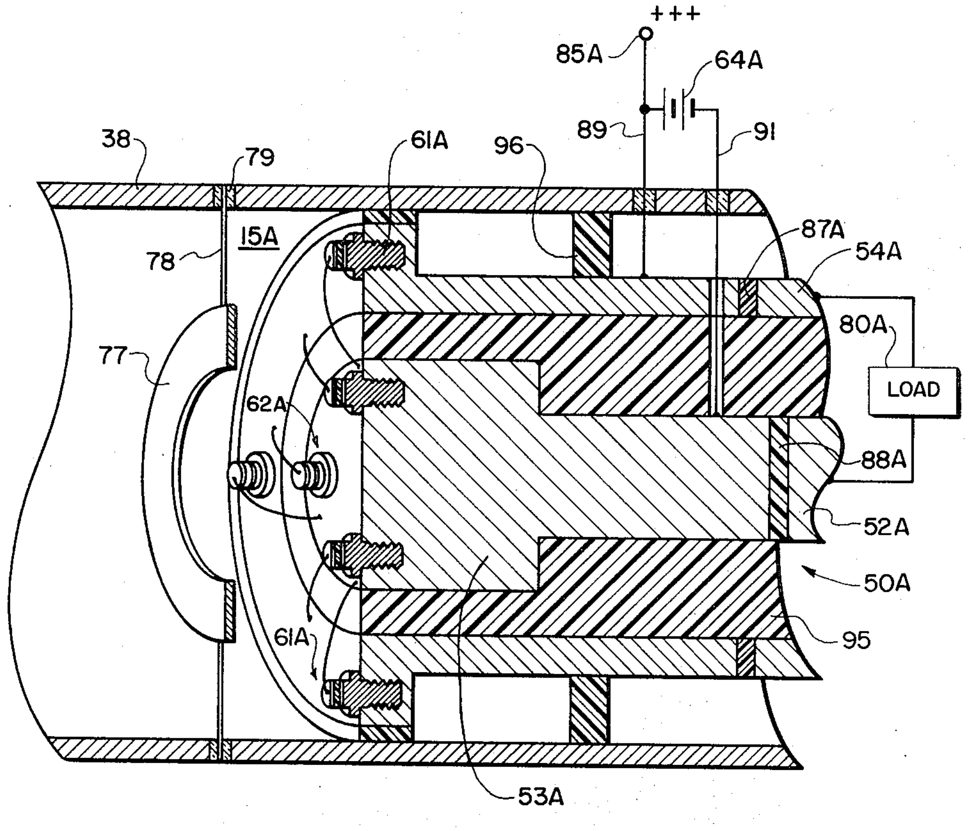

FIGS. 4*a*, 4*b* and 4*c* are diagrams illustrating the relative positions of the electron beam and diodes of the semiconductor target assembly, when a single diode array is used;

FIGS. 5*a*, 5*b* and 5*c* are diagrams illustrating the relative positions of the electron beam and diodes of a semiconductor target assembly which comprises two concentric arrays of diodes; and FIG. 6 is a view illustrating a typical coaxial transmission line semiconductor target diode mounting assembly.

Figure 1:
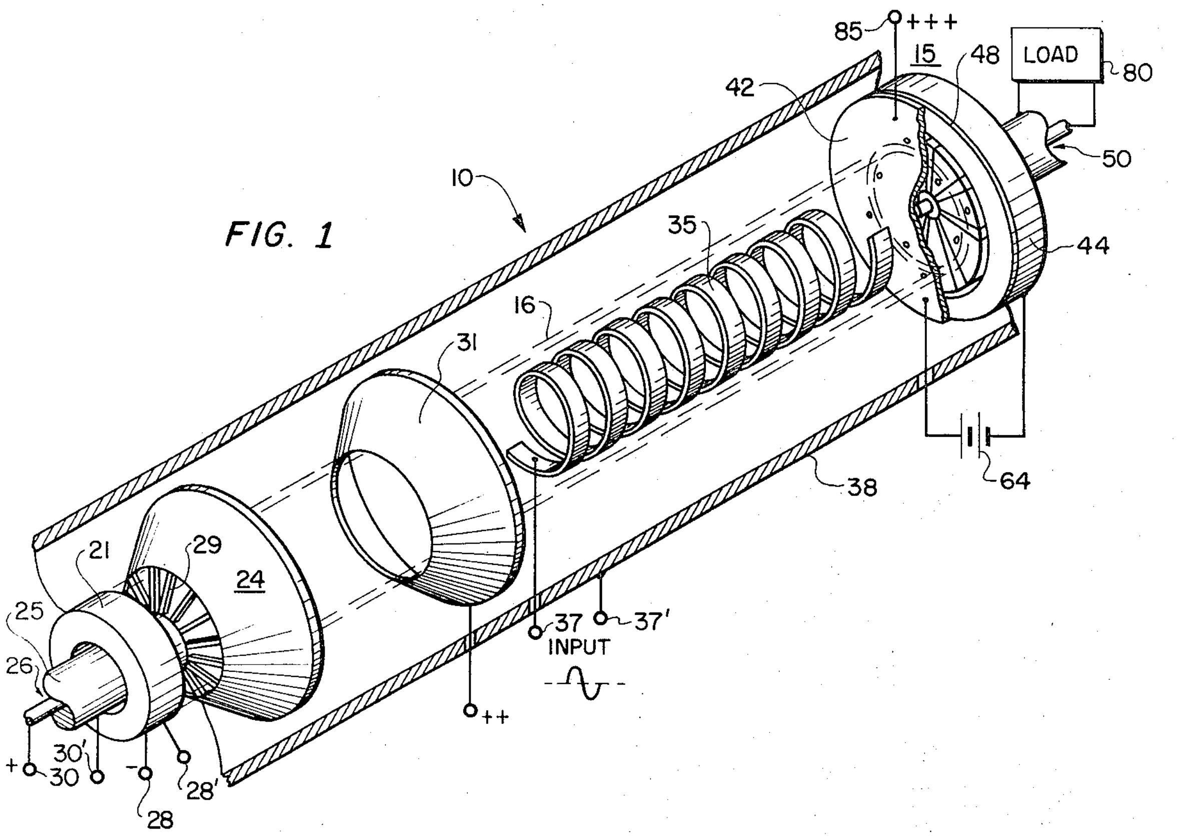
FIG. 1 is a view showing an amplifying device according to the invention, which includes a radial transmission line-semiconductor target diode mounting assembly.

Referring to FIG. 1, the electron device 10 involves the unique combination of a hollow electron beam forming assembly and a radial transmission line semiconductor target diode mounting assembly 15. As shown in FIG. 1, the beam forming assembly includes a toroidal cathode 21 which is connected to d.c. supply terminals 28, 28'. The cathode is maintained, typically, a few volts negative with respect to ground or other reference potential. The construction of the cathode 21 is such as to emit a hollow beam 16 of electrons, indicated in FIG. 1 by the dashed lines, according to principles well known in the electron tube art. One such annular beam system is described by L. S. Harris in an article entitled "Axially Symmetric electron beam and magnetic-field systems," Proc. I.R.E., Vol. 40, pages 700–708, June 1952. The hollow electron beam 16 is directed along the longitudinal axis of the electron device 10, which axis passes through the center of the radial transmission line. The cathode 21 surrounds a coaxial grid assembly which terminates at one end in an enlarged beam deflection cylinder 24 mounted to the outer conductor 35 of the coaxial line 26 by the frame 29. The coaxial line 26 can be supplied with a d-c biasing voltage at terminals 30, 30' for maintaining the cylinder 24 at a potential positive with respect to the cathode 21. One of the terminals, viz., terminals 28' and 30', can be at ground, as shown in FIG. 1, although this is not essential. In some applications, an rf input signal may be connected to the coaxial line terminals 30, 30' for modulating the hollow electron beam 16. A cylindrical beam accelerating electrode 31, maintained at a potential more positive than that of cylinder 24, also forms a portion of the beam forming system. Deflection modulation of the beam can be achieved by means of the traveling wave helical structure 35 which can be connected to one terminal 37 of an *rf* deflection input signal. The other terminal 37' can be connected, for example, to the grounded envelope 38 of the device. The helical structure 35 serves as a portion of the beam forming system and allows one to vary the beam diameter in accordance with the magnitude of the *rf* modulating voltage applied to terminsl 37, 37'. Since the traveling wave deflection structure 35 is a wideband structure, deflection modulation of the beam can be achieved at relatively high frequencies. The assembly 15 is connected to a potential more positive than that of electrode 31 and also serves to accelerate the electron beam to a relatively high energy level and also to permit the electron beam to impinge upon the semiconductor target diode.

Figure 2:
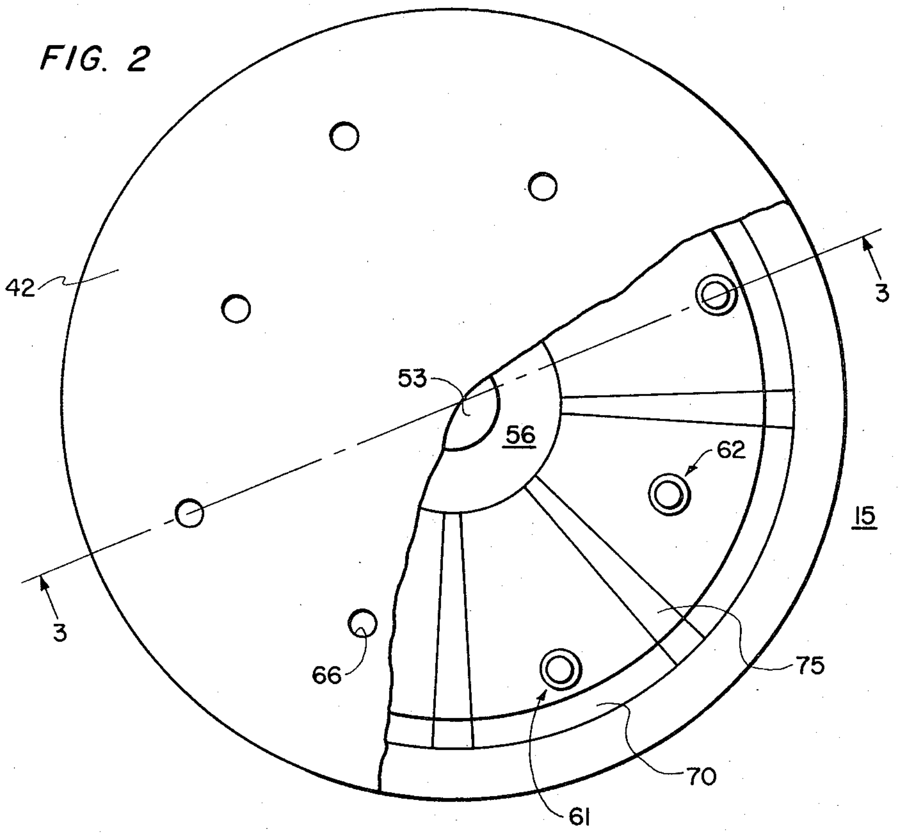
FIG. 2 is a plan view, with the top plate partially broken away, showing details of the semiconductor target assembly of the device of FIG. 1.
Figures 3, 3A:
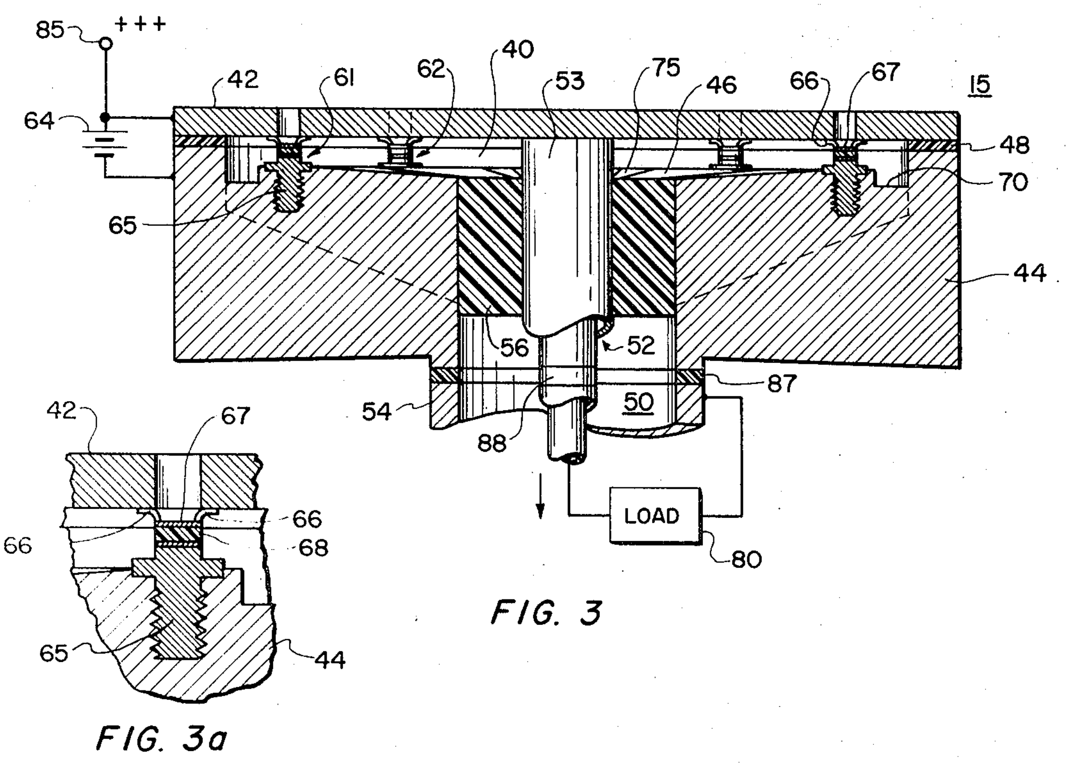
FIG. 3 is a section view of the semiconductor target assembly taken along line 3—3 of FIG. 2.
FIG. 3A is a detail view showing features of one of the semiconductor target diodes.

The semiconductor target diode mounting assembly 15 of the device of FIG. 1 mounted within the envelope 38 by appropriate electrically insulating means, not shown, and is described in detail in FIGS. 2 and 3; the assembly 15 includes a radial waveguide transmission line 40 bounded by a cover plate 42 and a cylindrical support member 44 to which the cover plate may be attached by any appropriate fastening means. The member 44, which is made of an electrically conductive material, has a tapered upper surface 46, for reasons to be described later. A coaxial line assembly 50 is disposed at the center of the radial transmission line 40 and includes an inner conductor 52 having an enlarged portion 53 which can be attached directly to the cover plate 42. The coaxial line assembly 50 can include two or more stepped transitions in cross-section in order to achieve a transformation of impedance. The transitions can be achieved, for example, by successive machining of the enlarged portion 53 of the inner conductor 52. The outer conductor 54 of the centrally disposed coaxial transmission line can comprise an integral portion of reduced cross section of the support member 44 of radial transmission line 40. A tubular dielectric element 56 can be disposed between the enlarged portion 53 of the coaxial line inner conductor 52 and the support member 44, as clearly shown in FIG. 3, to increase the dielectric constant, and facilitate wave propagation in the region where the radial line 40 and the coaxial line 50 meet. The dielectric element 56 also serves as additional support for the coaxial inner conductor 52.

An outer circularly arranged array of semiconductor target diodes 61 is disposed near the outer periphery of the cylindrical support member 44. Spaced from the first array of diodes 61 is an inner array of diodes 62 concentric with the first array. The diodes of array 61 are connected in parallel; the diodes of array 62 are similarily connected. The support member 44 contains threaded apertures for receiving the threaded portion of a corresponding one of diodes 61 and 62. As indicated clearly in FIG. 3A, each diode 61 and 62 also comprise a flanged portion 65 for seating to support member and a metallic tab portion 66 attached to the cover plate 42 and to the very thin metallic film electrode 67 coating the electron beam-bombarded face of the diode. The semiconductor material making up the shallow p-n junction is indicated by the reference numeral 68. The individual diodes 61 are reverse biased by means of a unidirectional source 64 which is connected between the inner and outer conductors of the coaxial line 52. In order to insulate the cover plate 42 electrically from the support member 44, an annular shim 48 of electrically insulating material is disposed between the cover plate 42 and the member 44. Inasmuch as the principal reason for using two separate diode arrays is to allow for Class B operation, the diodes 62 of the inner array should be of opposite conductivity type to that of the diodes 61 of the outer array in order to use a single biasing source 64 for both diode arrays. If the conductivity type of the diodes of the two arrays are the same, it will be necessary to use separate biasing sources of opposite polarity for each diode array. The cover plate 42 contains apertures 66 aligned with each of the several diodes 61 and 62 so that the active faces 68 of the diodes can be exposed to the annular bombarding electron beam 16. Disposed near the outer circumference of the support member 44 of the radial transmission line 40 is an annular slot 70 which serves as a shunt inductor to tune out the capacitance of the various diodes 61 and 62, thereby increasing the frequency range of operation of the amplifier. This slot 70 also serves as an rf choke to reduce leakage of rf energy to a minimum.

As already pointed out, the cover plate 42 and the support member 44 combine to form a radial waveguide transmission line 40 near the end of which is disposed the two concentric arrays of diodes 61 and 62. The current induced in each of diodes 61 and 62 owing to impingement by the electron beam 16 generates a radial electromagnetic wave which propagates toward the center of the radial line 40. The direction of the electric field will be more or less normal to the cover plate 42. The signal current path is from one terminal of bias supply 64 through the coaxial line outer conductor 54, support member 44, the diodes, the cover plate 42 and then by way of the inner conductor 52 back to the source 64. The load 80 is isolated from the unidirectional bias source 64, and from the high voltage supplied at terminal 85, by means of dielectric sets 87 and 88 in the coaxial line 50A. Since the impedance of these diodes is quite low, being of the order of two ohms, each diode should be located at a region of the radial line 40 which has a correspondingly low impedance. Since the impedance of radial line 40 is directly proportional to the dimension normal to the radial direction of propagation, the space between the cover plate 42 and the support member 44 is made comparatively small near the periphery of the radial line. Since the output or load impedance of the diode commonly is about 50 ohms - which impedance also is typical of commercially available coaxial lines-some means is required for transforming the low impedance in the region of the diodes to a higher load impedance. At the junction of the radial line 40 and the coaxial line 50, the electric field rotates in space, finally becoming normal to the longitudinal axis of the coaxial line during propagation thereby. At this junction, the impedance of the radial line should match that of the coaxial line at this junction, which, in practice, may be of the order of from 20 to 30 ohms. This increased impedance can be achieved by gradually increasing the spacing between the cover plate 42 and the support member 44 of the radial line 40. This is the explanation, therefore, for the tapered upper surface 46 of the support member 44, previously referred to. It is possible, of course, to construct either or both line-bounding structures 42 and 44 with a taper; however, in practice, the construction shown most clearly in FIG. 3 is more easily realizable.

Radial segments 75 of electrically resistive material are interposed between adjacent diodes of the two arrays to provide resistive coupling between diodes, thereby preventing oscillations in undesired modes. These segments may take the form of radial slots filled with resistive material, or may be resistive strips embedded within the support member 44. The radial resistive segments, which resistively load all undesired modes of resonance, must be disposed in a radial direction so as to be parallel to the direction of propagation of the radial waves of the desired purely radial mode, in which mode the diodes 61 and 62 are excited in phase synchronism by the electron beam 16.

Since the diodes 61 and 62 are excited by a single annular electron beam, it is necessary to position the beam with respect to the two arrays of diodes, in a manner illustrated in the diagrams of FIGS. 4*a* to 4*c*. When the electron beam 16 is in the quiescent position, that is, the position occupied by the beam in the absence of a deflection input signal, as indicated in FIG. 4*a*, the beam will not impinge upon any of the diodes. With two such concentric diode arrays, each of the two arrays is mounted on the radial transmission line on opposite sides of the location of the electron beam during the absence of a deflection input signal. With two arrays, the diodes 61 of the outermost array are excited only when the electron beam expands to the position indicated in FIG. 4*b*, while the diodes 62 of the innermost array are excited only when the electron beam contracts to the position indicated in FIG. 4*c*. A typical rf beam modulating signal for achieving the beam displacement shown in FIGS. 4*a* to 4*c* is shown in FIG. 1 at the input terminals 37, 37' of the amplifier device 10. During the positive excursion of the rf signal, the electron beam 16 is caused to expand to the position indicated in FIG. 4*b;* whereas, during the negative excursion of the rf signal, the beam 16 is made to contrast to the position indicated in FIG. 4*c*. The amount of expansion or contraction of the hollow beam will depend, of course, on the magnitude of the deflection input signal. In this manner, an amplified output of one polarity is derived from one array of diodes (of one conductivity type) during the positive excursion of the rf input modulation signal, and an amplified output of opposite polarity is obtained from the other array of diodes (of opposite conductivity type) during the negative position of the rf input modulation signal. When the rf signal is zero, the electron beam would not impinge upon either of the diode arrays.

Where the more efficient Class B operation is not required, one of the two diode arrays, for example the array of diodes 62, can be omitted. Referring to FIGS. 5*a* to 5*c*, which illustrates the case of a single array of diodes, the hollow electron beam at the semiconductor target diodes is either expanded (or contracted) in response to the deflection input signal so that it impinges upon the diodes 61 of that array, thereby controlling the semiconductor target diode current. The quiescent position of the electron beam 16 for such a single array of diodes 61 can be either as shown in FIG. 5*a* or as shown in FIG. 5*b*. When an output is desired, the electron beam is deflection modulated by a d-c voltage which can be supplied either at terminals 30, 30' of the coaxial grid structure or at the helix terminals 37, 37', or to both sets of terminals. If the quiescent position of the electron beam is as shown in FIG. 5*a*, the applied deflection voltage must be such as to expand the beam to the position shown in FIG. 5*c*. If, on the other hand, the quiescent position of the beam is as shown in FIG. 5*b*, the electron beam must be contracted to occupy the desired position indicated in FIG. 5*c*. If a single array is used, it is possible to modulate the beam by means of a d-c potential applied at the terminals 30, 30', and thus eliminate the beam modulating helix. In this case, the electron beam 16 would be cut off during use of two bistable grid bias conditions. The electron beam 16 would be turned on during the other bistable operating grid bias condition and would be a fixed beam suitable aimed so as to strike the diodes.

A coaxial transmission line semiconductor target diode mounting assembly 15A is illustrated in FIG. 6 which can be used in lieu of the radial waveguide semiconductor target diode mounting assembly 15 shown in FIGS. 1 to 3. The assembly 15A of FIG. 6 can be used with the hollow electron beam forming assembly shown in FIG. 1.

The diodes 61A of the first array are mounted on the flanged portion of the outer conductor 54A of the coaxial line assembly 50A while the diodes 62A of the innermost array are mounted on an enlarged portion 53A of the inner conductor 52A. The diodes 62A are of opposite conductivity type to that of the diodes 61A, just as is the case of diodes 62 and 61 in the devices of FIGS. 1–3.

The electron beam from the cathode 21 of FIG. 1 is accelerated toward the outer conductor which is maintained highly positive with regard to the electron gun and thus serves as a target. The electron beam, when in the quiescent position, strikes the annular shield 77 which is supported from the tube envelope 38 by support rods 78 electrically insulated from the envelope 38 by seals 79.

Each of the diodes 61A is connected between the inner and outer conductors 54A and 52A of the coaxial line 50A by leads 82 connected to the inner conductor and to that metal electrode of the diodes 61A which is exposed to the electron beam. Similarly, each of the diodes 62A is connected between the inner and outer conductors by leads 83 attached to the outer conductor and the electron-bombarded metal electrode of the diodes 62A. The diodes 61A are connected in parallel, as also are the diodes 62A. The diodes 61A and 62A are reverse-biased by the omnidirection supply 64A the terminals of which can be connected to the inner or outer conductors by leads 89 and 91 passing through appropriate insulating seals in the tube envelope 38. The lead 91, can be mounted within a bore cut into the inner conductor 54A and into the dielectric material 95 between the inner and outer conductor. The dielectric member 96 is a vacuum seal which allows passage of the signal wave energy.

The path for the rf current flowing in the diodes, when bombarded to the electron beam, includes the inner and outer conductors. In order to isolate load 80A from the high positive potential at terminal 85A, the dielectric inserts 87A and 88A are provided in the coaxial line assembly 50; these inserts, of course, do not block the flow of signal current in the load 80A.

Many other variations of the present invention obviously are possible in view of the above description. It is intended, therefore, that the scope of the present invention is not limited to those embodiments and modifications shown, but that it is to be limited only by the appended claims.

What is claimed is:

1. A solid state amplifying electron device for supplying wave energy to a load comprising wave energy transmission means, a plurality of reverse-biased semiconductor diodes having an impedance low compared with that of said load, said diodes being connected in parallel and angularly spaced in a common plane along said transmission means at a region thereof of impedance substantially equal to that of each of said diodes, said wave energy transmission means having impedance which progressively increases as said load is approached, means for producing a hollow electron beam, each of said diodes having electrodes formed on opposed surfaces thereof one of which electrodes is pervious to said beam electrons, each of said diodes having a depletion region adjacent said one electrode which is accessible to beam electrons impinging upon said diode, and means for selectively directing said hollow electron beam along the axis of said transmission means upon said diodes in response to an appropriate input control signal, each of said diodes having a current induced therein when impinged upon by said beam electrons, said diode current flow generating wave energy which is propagated along said wave energy transmission means.

2. A solid state amplifying electron device according to claim 1 wherein said transmission means includes a radial waveguide and said diodes are disposed adjacent the periphery of said radial waveguide.

3. A solid state amplifying electron device according to claim 2 wherein said diodes are arranged in two concentric arrays.

4. A solid state amplifying electron device according to claim 1 wherein the dimension of said radial waveguide normal to the direction of said wave propagation progressively increases in the direction of wave propagation.

5. A solid state amplifying electron device according to claim 4 further including a coaxial line disposed at the center of said radial wave transmission means and concentric with said diodes.

6. A solid state amplifying electron device according to claim 5 wherein the coaxial line has an inner conductor the dimensions of which decreases progressively in the direction of wave propagation.

7. A solid state amplifying electron device according to claim 6 further including resistive loading elements radially disposed between adjacent diodes for preventing operation in modes other than the desired radial mode.

8. A solid state amplifying electron device according to claim 1 wherein said diodes are arranged in two concentric arrays.

9. A solid state amplifying electron device according to claim 8 wherein the conductivity type of the diodes of one of said arrays is opposite to that of the diodes of the other of said arrays, and said input control signal is periodically varying.

10. A solid state amplifying electron device according to claim 1 wherein said means for selectively directing comprises a travelling wave structure to which said input control signal is applied.

11. A solid state amplifying electron device according to claim 10 wherein said diodes form a single array.

12. A solid state amplifying electron device according to claim 1 wherein said transmission means includes a coaxial waveguide having an inner and outer conductor and said diodes are disposed adjacent one end thereof between said coaxial conductors.

13. A solid state amplifying electron device according to claim 12 wherein said diodes form a single array.

14. A solid state amplifying electron device according to claim 12 wherein said diodes are arranged in two concentric arrays wherein the conductivity type of the diodes of one of said arrays is opposite to that of the diodes of the other of said arrays, and said control input signal is periodically varying.

15. A solid state amplifying electron device according to claim 12 wherein each of said diodes are connected in parallel between said inner and outer conductors.

* * * * *